(12) United States Patent
Staats

(10) Patent No.: US 6,782,672 B2
(45) Date of Patent: Aug. 31, 2004

(54) SANDWICH PANEL STRUCTURAL JOINT

(75) Inventor: James R. Staats, Santa Clarita, CA (US)

(73) Assignee: Alliance Spacesystems, Inc., Pasadena, CA (US)

( * ) Notice: Subject to any disclaimer, the term of this patent is extended or adjusted under 35 U.S.C. 154(b) by 105 days.

(21) Appl. No.: 10/266,224

(22) Filed: Oct. 8, 2002

(65) Prior Publication Data

US 2004/0065041 A1 Apr. 8, 2004

(51) Int. Cl.[7] ............................................. E04B 1/38
(52) U.S. Cl. ...................... 52/591.2; 52/272; 52/588.1; 52/589.1
(58) Field of Search ................... 52/272, 284, 791.1, 52/793.1, 309.9, 588.1, 591.2, 592.1, 36.5, 36.6, 589.1; 446/124; 428/116, 192; 244/131; 403/231, 375, 381

(56) References Cited

U.S. PATENT DOCUMENTS

| | | | | |
|---|---|---|---|---|
| 2,882,714 A | * | 4/1959 | Gagle Duane W et al. ... | 52/604 |
| 2,887,732 A | * | 5/1959 | Kloote George E et al. .. | 52/275 |
| 3,608,260 A | * | 9/1971 | Eckel et al. .................. | 52/284 |
| 3,836,217 A | * | 9/1974 | Shiina ........................ | 312/107 |
| 4,173,287 A | * | 11/1979 | Kumakawa .................. | 217/65 |
| 4,461,395 A | | 7/1984 | Burnett ........................ | 217/12 |
| 4,527,364 A | * | 7/1985 | Baus ........................... | 52/127.7 |
| 4,793,727 A | | 12/1988 | Schmaling .................... | 403/340 |
| 4,920,722 A | * | 5/1990 | Bosi ............................ | 52/592.1 |
| 5,030,488 A | | 7/1991 | Sobolev ........................ | 428/35.9 |
| 5,041,318 A | | 8/1991 | Hulls ............................ | 428/57 |
| 5,297,836 A | * | 3/1994 | Parry-Williams ............. | 296/203.01 |
| 5,746,038 A | * | 5/1998 | Houk .......................... | 52/590.1 |
| 5,803,402 A | | 9/1998 | Krumweide et al. ........ | 244/117 |
| 6,325,568 B1 | | 12/2001 | Druckman et al. ......... | 403/282 |

* cited by examiner

Primary Examiner—Robert Canfield
(74) Attorney, Agent, or Firm—Stetina Brunda Garred & Brucker

(57) ABSTRACT

A sandwich panel structure comprises a slotted panel and a tabbed panel. The slotted panel includes a slotted panel core body and a first slotted panel facesheet. The slotted panel core body defines a first slotted panel side with the first slotted panel facesheet disposed adjacent thereto and including a plurality of first slots. The tabbed panel includes a tabbed panel core body and a first tabbed panel facesheet, the tabbed panel core body defining a first tabbed panel side with the first tabbed panel facesheet disposed thereto. The first tabbed panel facesheet includes a plurality of first tabs disposed along a first joint edge with each of the first tabs respectively sized and configured to be received by a respective one of the first slots upon insertion of the first tabs into the first slots for joining the tabbed panel to the slotted panel at the first joint edge.

21 Claims, 3 Drawing Sheets

SANDWICH PANEL STRUCTURAL JOINT

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to sandwich panels and, more particularly, to a sandwich panel structural joint.

Sandwich panels are increasingly used in aerospace products such as aircraft, helicopters, and spacecraft due to their desirable strength, weight, and stiffness characteristics. Sandwich panels are typically comprised of a panel core body having opposing first and second panel sides with at least one panel facesheet attached to the panel core body adjacent the first panel side. In this regard, a sandwich panel is a layered construction formed by bonding at least one or, more typically, two thin panel facesheets to the thicker panel core body. A sandwich panel is of a stressed skin type of construction in which the facesheets resist all, or nearly all, of the applied edgewise loads and planar bending moments. The spacing between the thin facesheets provides all, or nearly all, of the bending rigidity to the sandwich panel construction. The core body spaces the facesheets and transmits shear loads between them so that they are effective about a neutral axis. The core body also provides most of the shear rigidity of the sandwich panel construction. Proper choice of materials for the facesheets and the core body results in a sandwich panel construction with a high ratio of stiffness to weight. Sandwich panels must be joined to provide stiff frames capable of handling the high stresses typical of aerospace fight vehicles. The sandwich panel joints must be capable of handling bending moment, shear, tension and compression stresses.

In addition, the sandwich panel joints in spacecraft can also serve a secondary purpose in aiding in the dissipation of excess heat generated by instrumentation mounted in the interior of the spacecraft. As an aid to the active cooling system common to many spacecraft, heat can be conducted to the spacecraft exterior from the sandwich panels upon which the instrumentation and electronics are mounted. However, sandwich panels do not readily conduct heat across the core body to the exterior because the core body is generally constructed of a cellular material. Therefore, it is highly desirable to have a sandwich panel joint configuration that can assist in the conduction of heat from the interior facesheet upon which instrumentation is mounted to an exterior facesheet of an adjacent panel.

Prior art approaches for sandwich panel joint configurations are numerous. For example, the prior art describes a sandwich panel structural member which includes an integrally formed joint-forming edge structure. The joint-forming edge structure is adapted to be bonded to a complementary integrally formed joint-forming edge structure, such that the joining of any two sandwich panel structural members with the same edge structure requires no separate joining members to assist in the handling of joint loads. Each joint-forming edge structure includes a flange that extends from the sandwich portion of the sandwich panel, a web that extends from one panel skin to the other, and a flange-receiving portion integrally formed with and extending inward from the joint edge. Although this joint configuration has the benefit of accommodating any panel having the same integral edge configuration, the drawbacks are that it requires many additional joint structural members that must be laid up over the entire edge portion of each panel, necessitating special edge tooling and increasing the manufacturing cost and complexity.

The prior art also describes a sandwich panel construction utilizing a single piece of folded thermoplastic-composite-skinned, honeycomb-cored sandwich panel utilizing minimum edge-margin mortise and tenon joint corner structure. Formed by folding the single piece of sandwich panel material into a locking open box type structure, the sandwich panel structure contains interlocking joints characterized as mortise and tenon joints. End panels are folded up from the sides of a bottom panel to form side walls. Tenons extend from the margins of the right and left end panels. Mortise packets are formed in the side margins of the upper panels. The mortises and tenons create interlocking mortise and tenon joints, requiring no additional joint members. The manufacturing advantages of this sandwich panel structure are that it is constructed of one piece and is essentially self-tooling in that it has interlocking joints requiring no adhesive. However, the drawback of this configuration is that it is incapable of handling high loading conditions often encountered in aerospace flight vehicles.

Also included in the prior art is a composite sandwich panel joint comprising a first and second article. The first and second articles each include a filler layer disposed between a first and second composite layer. An end section of the first article's first composite layer is disposed external to, overlapping and bonded to an end section of the second article's first composite layer to form a first overlap. An end section of the second article's second composite layer is disposed internal to, overlapping and bonded to an end section of the first article's second composite layer to form a second overlap. The first overlap is displaced across the thickness and along the length of the joint from the second overlap. Loads are transferred across the joint from first layer to first layer and from second layer to second layer. Although this configuration has improved ability to withstand axial and bending loads, it has drawbacks in that it is complex and has a lengthy manufacturing time due to the additional joint members that must be concurrently laid up and co-cured over the entire edge of each panel.

As can be seen, there is a need for a sandwich panel joint configuration for a sandwich panel structure that is capable of providing an efficient load path across adjacent sandwich panel. Also, there is a need for a sandwich panel joint configuration that is of simple construction with a minimal number of parts. Furthermore, there is a need for a sandwich panel joint configuration with improved heat conduction capabilities across adjacent composite panels. Finally, there is a need for a simple sandwich panel joint configuration that easily connects sandwich panels having substantially differing thicknesses.

BRIEF SUMMARY OF THE INVENTION

The present invention specifically addresses and alleviates the above referenced deficiencies associated with sandwich panels. More particularly, the present invention is an improved sandwich panel joint configuration.

In accordance with an embodiment of the present invention, there is provided a sandwich panel structure comprising a slotted panel and a tabbed panel. The slotted panel includes a slotted panel core body and a first slotted panel facesheet. The slotted panel core body further defines opposing first and second slotted panel sides. The first slotted panel facesheet is disposed adjacent the first slotted panel side and further includes a plurality of first slots formed therethrough.

The tabbed panel includes a tabbed panel core body and a first tabbed panel facesheet. The tabbed panel core body further defines opposing first and second tabbed panel sides, the first tabbed panel facesheet disposed adjacent the first tabbed panel side. The first tabbed panel facesheet further includes a first joint edge and a plurality of first tabs disposed along the first joint edge with each of the first tabs respectively sized and configured to be received by a respective one of the first slots upon insertion of the first tabs into the first slots for joining the tabbed panel to the slotted panel at the first joint edge.

The sandwich panel structure of the present invention differs from existing sandwich panel structures in that the sandwich panel joint configuration of the present invention provides an efficient load path across adjacent sandwich panels. In addition, the sandwich panel joint configuration of the present invention may provide improved heat conduction characteristics across the joint. This is because a tabbed panel facesheet of an interior panel that supports instrumentation may also transfer the heat generated by the instrumentation to the exterior of an adjacent slotted panel.

According to various embodiments, the tabbed panel may be disposed generally perpendicular to the slotted panel. The tabbed panel may further be disposed at an angle from about 45° to about 135° to the slotted panel. The first tabs may further be aligned and in another embodiment, the first tabs may be bonded to the first slots. The first tabs may extend through at least about 50 percent of a thickness of the slotted panel core body, and in another embodiment the first tabs may extend through at least about 80 percent of a thickness of the slotted panel core body.

The slotted panel may further include a second slotted panel facesheet disposed adjacent the first slotted panel side. The tabbed panel may further include a second tabbed panel facesheet disposed adjacent the second tabbed panel side. The first tabbed panel facesheet may further be constructed of a heat conducting material. The first slotted panel facesheet may be formed of a metal material. The first tabbed panel facesheet may also be formed of a metal material.

The tabbed panel core body may further be formed of a cellular material. The cellular material may further be a honeycomb material. The honeycomb material may further include a plurality of cells, the cells further defining longitudinal axes extending perpendicular to the first and second slotted panel with the first tabs further extending through the first slots parallel to the longitudinal axes of the cells. The orientation of the longitudinal axes of the cells parallel to the first tabs may further aid in the conduction of heat away from the first tabbed panel facesheet to the second slotted panel side. The tabbed panel core body and the slotted panel core body may further be formed of a metal material. The slotted panel core body may further define a slotted panel end and the first slots may further be disposed adjacent to and along the slotted panel end. The tabbed panel core body may further include a second tabbed panel facesheet disposed adjacent the slotted panel end with the first tabs received by the first slots.

The first slotted panel facesheet may further include a plurality of first and second slots and the first and second slots may further be formed through the first slotted panel facesheet and arranged in two generally parallel rows. The tabbed panel may further include a second tabbed panel facesheet and the second tabbed panel facesheet may further by disposed adjacent the second tabbed panel side. The second tabbed panel facesheet may further include a plurality of second tabs disposed respectively along a second joint edge. Each of the second tabs may further be respectively sized and configured to be received by a respective one of the first and second slots upon insertion of the second tabs into the respective second slots for joining the tabbed panel to the slotted panel at the second joint edge.

BRIEF DESCRIPTION OF THE DRAWINGS

These as well as other features of the present invention will become more apparent upon reference to the drawings wherein.

DETAILED DESCRIPTION OF THE INVENTION

An embodiment of the present invention will now be described in particular with reference to the accompanying drawings.

Figure 1:
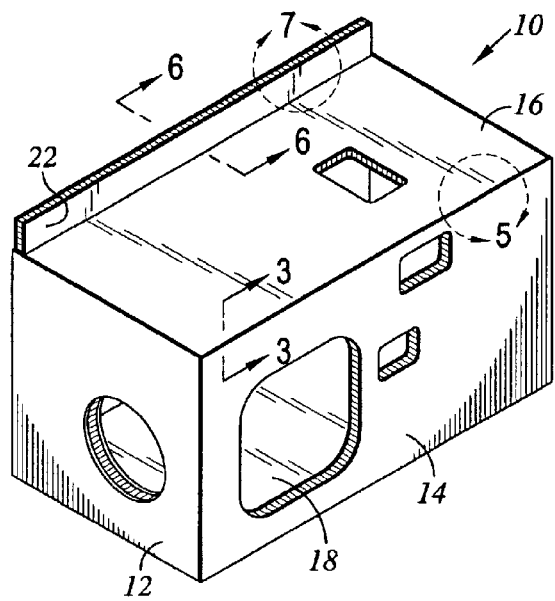
FIG. 1 is a perspective view of a sandwich panel structure in accordance with the present invention.

Referring to FIG. 1, shown is a sandwich panel structure 10 incorporating the joint configurations of the present invention. In the embodiment shown, the sandwich panel structure 10 is comprised of panels 12, 14, 16, 18, 20 and 22 assembled to form a six-sided box structure. It is recognized herein that there are an infinite number of panel arrangements that may be assembled to form a sandwich panel structure utilizing the joint configurations of the present invention as will be described in more detail below.

Figure 2:
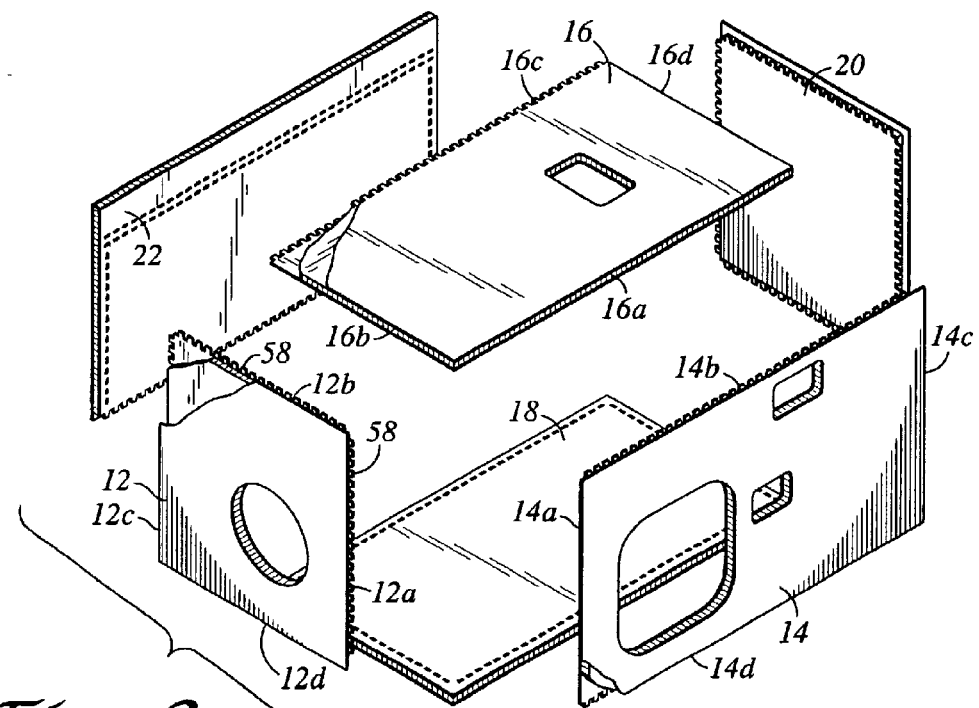
FIG. 2 is an exploded perspective view of the sandwich panel structure of FIG. 1 illustrating the connective relationship of the tabbed panels and slotted panels that make up the sandwich panel structure.

Referring now to FIG. 2, shown is an exploded perspective view of the sandwich panel structure 10 of FIG. 1 illustrating the connective relationship of tabbed panels 42 and slotted panels 24 that make up the sandwich panel structure 10. In FIG. 2, panel 12 is shown having borders 12a, 12b, 12c and 12d disposed peripherally thereon. Borders 12a and 12b each include a plurality of first tabs 58 extending therefrom. Panel 14 has borders 14a, 14b, 14c and 14d disposed peripherally thereon. Border 14a includes a plurality of first slots 38 for receiving the first tabs 58 of border 12a. Panel 16 includes borders 16a, 16b, 16c and 16d disposed peripherally thereon, with border 16b including first slots 38 for receiving the first tabs 58 of border 12b. As is shown in FIG. 2, panels 12 and 14 are joined at the intersection of border 12a with border 14a by interengaging the first tabs 58 of border 12a with the first slots 38 of border 14a. Panels 12 and 16 are joined at the intersection of border 12b with border 16b by interengaging the first tabs 58 of border 12b with the first slots 38 of border 16b. With the exception of the joint between panels 16 and 22, the remaining joints of panels 12, 14, 16, 18, 20 and 22 of the sandwich panel structure 10 illustrated in FIGS. 1 and 2 are joined at their respective borders in a manner similar to the joint at the intersection of borders 12a with 14a, and 12b with 16b, described above. Panels 16 and 22 of sandwich panel structure 10 are joined at their respective borders utilizing another joint configuration illustrated in FIGS. 6 and 7 and described in detail below.

As used herein, the term slotted panel refers to any panel having slots with respect to an adjacent tabbed panel to which it is joined. That slotted panel may also be referred to as a tabbed panel having tabs with respect to a slotted panel to which it is joined. Likewise, the term tabbed panel refers to any panel having tabs with respect to an adjacent slotted panel to which it is joined. That tabbed panel may also be referred to as a slotted panel having slots with respect to a tabbed panel to which it is joined. Thus, in a sandwich panel structure of the present invention, a single panel may be referred to as both a slotted panel and a tabbed panel depending on the joint configuration between adjacent panels. For example, following the foregoing conforming definition, with respect to the joint configuration of border 12a with border 14a, panel 12 is referred to as a tabbed panel 42 while panel 14 is referred to as a slotted panel 24 according to the conforming definition of a tabbed panel 42 and a slotted panel 24. Likewise, with respect to the joint configuration of border 14b with border 16b, panel 14 is referred to as a tabbed panel 42 while panel 16 is referred to as a slotted panel 24. Accordingly, panels 12, 14, 16, 18, 20 and 22 are classifiable as either a tabbed panel 42 or a slotted panel 24 depending upon the joint configuration of panels 12, 14, 16, 18, 20 and 22 at the intersection of their respective borders.

Figure 3:
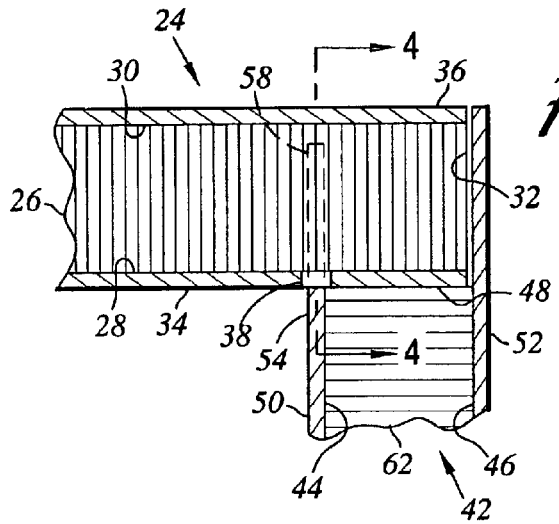
FIG. 3 is a cross-sectional view taken along line 3—3 of FIG. 1 illustrating the arrangement of the sandwich panel joint configuration wherein a first tabbed panel facesheet of a tabbed panel is engaged with a slotted panel.
Figure 5:
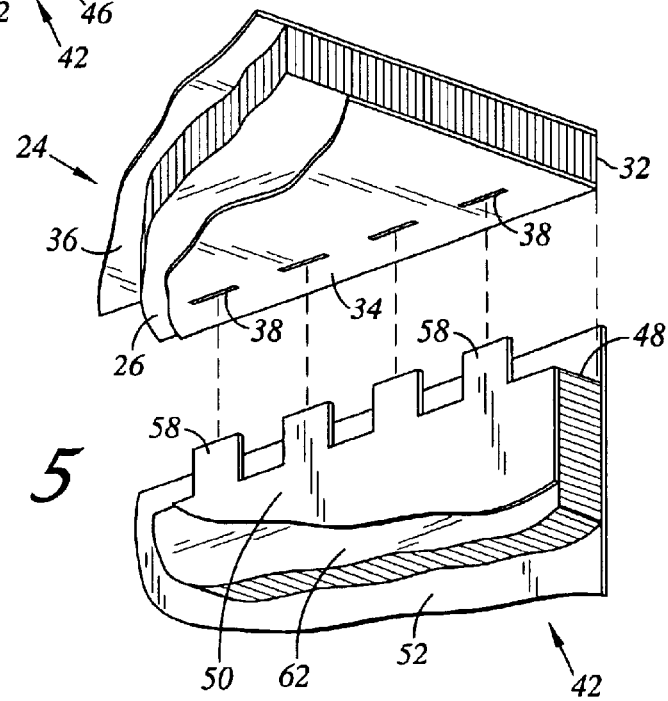
FIG. 5 is an exploded perspective view of the sandwich panel structure taken from an interior perspective of FIG. 1 illustrating the connective relationship of the tabbed panel with the slotted panel.

Turning now to FIGS. 3 and 5, illustrated is the arrangement of a joint configuration of the sandwich panel structure 10 of FIG. 1. FIG. 3 is a cross-sectional view taken along line 3—3 of FIG. 1 illustrating the arrangement of the joint configuration wherein a first tabbed panel facesheet 50 of the tabbed panel 42 is engaged with the slotted panel 24. FIG. 5 is an exploded perspective view of the sandwich panel structure 10 taken from an interior perspective of FIG. 1 illustrating the connective relationship of the tabbed panel 42 with the slotted panel 24. In FIGS. 3 and 5, the sandwich panel structure 10 is comprised of the slotted panel 24 fixedly connected to the tabbed panel 42. As can be seen in FIG. 3, the slotted panel 24 is disposed generally perpendicular to the tabbed panel 42. However, the tabbed panel 42 may be disposed to the slotted panel 24 at any angle. For example, the tabbed panel 42 may be disposed to the slotted panel 24 at an angle from about 45° to about 135°. The slotted panel 24 of the present invention includes first slotted panel facesheet 34 and slotted panel core body 26. The slotted panel core body 26 has opposing first and second slotted panel sides 28, 30 and a slotted panel end 32 which may be disposed perpendicular to the first and second slotted panel sides 28, 30.

In FIG. 3, the slotted panel core body 26 is generally shown constructed of cellular material arranged in a honeycomb configuration, wherein the cellular material is also a heat conducting material. The honeycomb material includes a plurality of cells, the cells defining longitudinal axes extending perpendicular to the first and second slotted panel side 28, 30. The engagement of the first tabs 58 into the slotted panel core body 26 formed of honeycomb material may aid in the conduction of heat away from the interior of the sandwich panel structure 10. By arranging the longitudinal axes of the honeycomb cells so that the axes extend perpendicular to the slotted panel 24 with the first tabs 58 extending into the first slotted panel facesheet 34 parallel to the longitudinal axes of the cells, the first tabs 58 provide an efficient heat conduction path away from the interior of the sandwich panel structure 10 to the exterior of the slotted panel 24. Although in FIG. 3 the slotted panel core body 26 is generally shown constructed of cellular material arranged in a honeycomb configuration, it is contemplated that the slotted panel core body 26 may be formed of any material and may be arranged within the slotted panel core body 26 in any suitable manner.

FIGS. 3 and 5 further show the first slotted panel facesheet 34 disposed adjacent the first slotted panel side 28. The second slotted panel facesheet 36 is disposed adjacent the second slotted panel side 30. The first slotted panel facesheet 34 includes first slots 38 passing therethrough. In accordance with the present invention, the first and second tabbed panel and slotted panel facesheets 34, 36, 50, 52 are formed of aluminum. However, it is contemplated that the first and second tabbed panel and slotted panel facesheets 34, 36, 50, 52 may be formed of any suitable material.

As can be seen in FIGS. 3 and 5, the tabbed panel 42 includes a tabbed panel core body 62 and the first tabbed panel facesheet 50, the tabbed panel core body 62 having opposing first and second tabbed panel sides 44, 46 and a tabbed panel end 48 which may be disposed perpendicular to the first and second tabbed panel sides 44, 46. The first tabbed panel facesheet 50 is disposed adjacent the first tabbed panel side 44. The second tabbed panel facesheet 52 is disposed adjacent the second tabbed panel side 46. The first tabbed panel facesheet 50 also includes first tabs 58 disposed along a first joint edge 54 as illustrated in FIG. 4.

Figure 4:
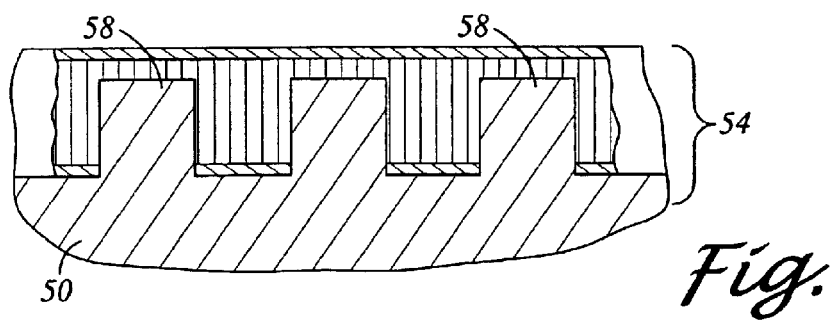
FIG. 4 is a side view of a portion of the tabbed panel taken along line 4—4 of FIG. 3 illustrating the arrangement of the tabs along a joint edge of the tabbed panel.

Referring to FIG. 4, shown is a side view of a portion of the tabbed panel 42 taken along line 4—4 of FIG. 3 illustrating the arrangement of the first tabs 58 along the first joint edge 54 of the tabbed panel 42. In FIG. 4, the first tabs 58 of the first tabbed panel facesheet 50 are shown disposed along the first joint edge 54. Each of the first tabs 58 is respectively sized and configured to be received by a respective one of the first slots 38 upon insertion of the first tabs 58 into the first slots 38 for joining the tabbed panel 42 to the slotted panel 24 at the first joint edge 54. However, other shapes, sizes, configurations and geometries for joining the first tabs 58 to the first slots 38 may be utilized. For example, the first tabs 58 may be wave-shaped with the first slots 38 configured accordingly to receive the first tabs 58.

Referring back to FIGS. 3 and 5, the first tabs 58 may be bonded to the first slots 38. Optionally, the slotted panel core body 26 in the area adjacent the first slots 38 may be filled with core body filler in order to improve the bond of the first tabs 58 to the tabbed panel core body 62 and increase the overall strength characteristics of the joint. Also, the slotted panel end 32 may be bonded to the second slotted panel facesheet 36. Further, the slotted panel core body 26 adjacent the slotted panel end 32 may be filled with core body filler in order to improve the strength characteristics of the bond between the second tabbed panel facesheet 52 and the slotted panel end 32. Still further, the tabbed panel end 48 may be bonded to the first slotted panel facesheet 34. The tabbed panel core body 62 adjacent the tabbed panel end 48 may also be filled with core body filler in order to improve the strength characteristics of the bond between the tabbed panel end 48 and the first slotted panel facesheet 34. Although not shown, an exterior flange may be bonded to the exterior of the second slotted panel facesheet 36 and the exterior of the second tabbed panel facesheet 52 in order to improve the strength characteristics of the joint.

Referring still to FIGS. 3 and 5, the first tabs 58 of the first tabbed panel facesheet 50 may be aligned to each other as shown. However, other arrangements of the first tabs 58 may be utilized. For example, configuring the first tabs 58 in a staggered formation to be received by first slots 38 arranged in a complementary formation may suffice. Additional arrangements are contemplated regarding the engagement of the first tabs 58 with the first slots 38. For example, in FIG. 3, the first tabs 58 are shown extending through at least about 50 percent of a thickness of the slotted panel core body 26. However, it is contemplated that the first tabs 58 may be configured to extend through any range of thickness of the slotted panel core body 26. For example, the first tabs 58 may extend through at least about 80 percent of a thickness of the slotted panel core body 26.

Figure 6:
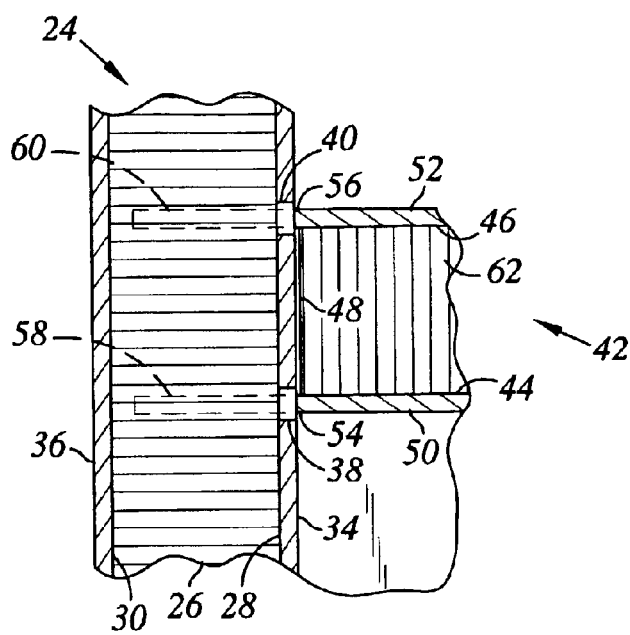
FIG. 6 is a cross-sectional view taken along line 6—6 of FIG. 1 illustrating the arrangement of the sandwich panel joint configuration wherein opposing first and second tabbed panel facesheets of the tabbed panel are engaged to the first slotted panel facesheet of the slotted panel.
Figure 7:
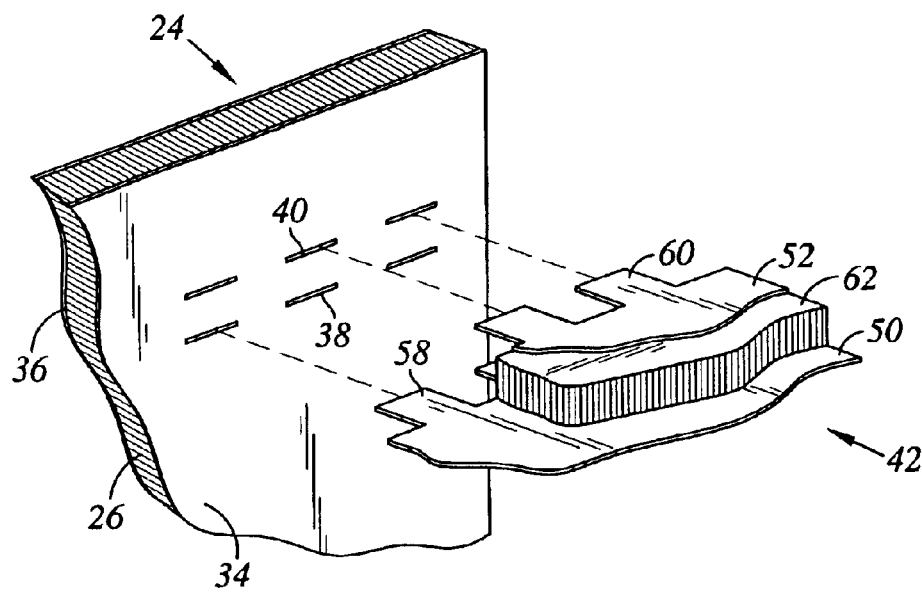
FIG. 7 is an exploded perspective view of the sandwich panel structure taken from an interior perspective of FIG. 1 illustrating the connective relationship of the opposing tabbed panel facesheets of the tabbed panel with the slotted panel facesheets of the slotted panel.

Turning now to FIGS. 6 and 7, illustrated is another joint configuration of the sandwich panel structure 10. FIG. 6 is a cross-sectional view taken along line 6—6 of FIG. 1 illustrating the arrangement of the joint configuration wherein first and second tabbed panel facesheets 50, 52 of the tabbed panel 42 are engaged to the first slotted panel facesheet 34 of the slotted panel 24. FIG. 7 is an exploded perspective view of the sandwich panel structure 10 taken from an interior perspective of FIG. 1 illustrating the connective relationship of the first and second tabbed panel facesheets 50, 52 of the tabbed panel 42 with the first slotted panel facesheet 34 of the slotted panel 24. In FIG. 6, the first slotted panel facesheet 34 includes first slots 28 and a plurality of second slots 40 formed therethrough and arranged in two generally parallel rows. The tabbed panel 42 further includes the second tabbed panel facesheet 52 disposed adjacent the second tabbed panel side 46. The second tabbed panel facesheet 52 further includes a plurality of second tabs 60 disposed respectively along a second joint edge 56. Each of the second tabs 60 is respectively sized and configured to be received by a respective one of the first and second slots 38, 40 upon insertion of the second tabs 60 into the respective second slots 40 for joining the tabbed panel 42 to the slotted panel 24 at the second joint edge 56. As is shown in FIG. 2, panels 16 and 22 are joined at their respective borders 16c and 22a utilizing the joint configuration illustrated in FIGS. 6 and 7. Border 16c has first and second tabs 58, 60 extending therefrom, with border 22a including first and second slots 38, 40 for receiving the first and second tabs 58, 60 of border 16c. Panels 16 and 22 are joined by interengaging the first and second tabs 58, 60 of border 16c with the first and second slots 38, 40 of border 22a. It is recognized herein that there are an infinite number of panel arrangements and border configurations that may be assembled utilizing any combination of the joint configurations illustrated in FIGS. 3 and. 6.

The sandwich panel structure 10 of the present invention differs from existing sandwich panel structures in that the joint configuration does not require additional joint members in order to provide an efficient load path across the joint. The sandwich panel structure 10 requires only treatment of at least one of first and second tabbed panel facesheets 50, 52 of the tabbed panel 42 and treatment of at least one of first and second slotted panel facesheets 34, 36 of the slotted panel 24 to allow for the interengagement of the tabbed panel 42 with the slotted panel 24 in order to form a joint. Furthermore, the sandwich panel structure 10 of the present invention differs from existing sandwich panel structures in that the sandwich panel structure 10 can assist in the conduction of heat away from interior facesheets to exterior facesheets. For example, spacecraft are often configured so that the instrumentation, electronics and power systems are mounted on interior facesheets such as those utilized in sandwich panel structure 10. Although spacecraft typically include an active cooling system for extracting the heat generated by the instrumentation, electronics and power systems, the joint configuration of the present invention can aid in the cooling due to the engagement of the first tabs 58 of the tabbed panel 42 into a slotted panel core body 26 of an adjacent slotted panel 24. It is recognized herein that the joint configuration of the present sandwich panel structure 10 may be utilized in any structure other than the aerospace structure into which the present invention is incorporated.

Additional modifications and improvements of the present invention may also be apparent to those of ordinary skill in the art. For example, in FIG. 7, second tabs 60 could be implemented using a separate strip that is bonded to second tabbed panel facesheet 52. Similarly, in FIG. 3, the extension of second tabbed panel facesheet 52 that overlaps and may be bonded to slotted panel end 32 may also be a separate strip that is bonded to second tabbed panel facesheet 52. Thus, the particular combination of parts described and illustrated herein is intended to represent only certain embodiments of the present invention, and is not intended to serve as limitations of alternative devices within the spirit and scope of the invention.

What is claimed is:

1. A sandwich panel structure comprising:

a slotted panel including a slotted panel core body and a first slotted panel facesheet, the slotted panel core body defining opposing first and second slotted panel sides, the first slotted panel facesheet disposed adjacent the first slotted panel side and including a plurality of first slots formed therethrough; and a tabbed panel including a tabbed panel core body and a first tabbed panel facesheet, the tabbed panel core body defining opposing first and second tabbed panel sides, the first tabbed panel facesheet disposed adjacent the first tabbed panel side, the first tabbed panel facesheet including a first joint edge and a plurality of first tabs disposed along the first joint edge with each of the first tabs respectively sized and configured to be received by a respective one of the first slots upon insertion of the first tabs into the first slots for joining the tabbed panel to the slotted panel at the first joint edge, the first tabs extending through at least about 50 percent of a thickness of the slotted panel core body.

2. The sandwich panel structure of claim 1 wherein the first tabs are bonded to the first slots.

3. The sandwich panel structure of claim 1 wherein the tabbed panel is disposed generally perpendicular to the slotted panel.

4. The sandwich panel structure of claim 1 wherein the tabbed panel is disposed at an angle from about 45° to about 135° to the slotted panel.

5. The sandwich panel structure of claim 1 wherein the first tabs are aligned.

6. The sandwich panel structure of claim 1 wherein the first tabs extend through at least about 80 percent of a thickness of the slotted panel core body.

7. The sandwich panel structure of claim 1 wherein the slotted panel includes a second slotted panel facesheet disposed adjacent the first slotted panel side.

8. The sandwich panel structure of claim 7 wherein the tabbed panel includes a second tabbed panel facesheet disposed adjacent the second tabbed panel side.

9. The sandwich panel structure of claim 1 wherein the first tabbed panel facesheet is constructed of a heat conducting material.

10. The sandwich panel structure of claim 1 wherein the first slotted panel facesheet is formed of a metal material.

11. The sandwich panel structure of claim 1 wherein the first tabbed panel facesheet is formed of a metal material.

12. The sandwich panel structure of claim 1 wherein the tabbed panel core body is formed of a cellular material.

13. The sandwich panel structure of clam 12 wherein the cellular material is a honeycomb material.

14. The sandwich panel structure of claim 13 wherein the honeycomb material includes a plurality of cells, the cells define longitudinal axes extending perpendicular to the first and second slotted panel, the first tabs extend through the first slots parallel to the longitudinal axes of the cells.

15. The sandwich panel structure of claim 14 wherein the orientation of the longitudinal axes of the cells parallel to the first tabs aids in the conduction of heat from the first tabbed panel facesheet to the second slotted panel side.

16. The sandwich panel structure of claim 1 wherein the tabbed panel core body and the slotted panel core body are formed of a metal material.

17. The sandwich panel structure of claim 1 wherein the slotted panel core body defines a slotted panel end, the first slots are disposed adjacent to and along the slotted panel end, the tabbed panel core body further includes a second tabbed panel facesheet disposed adjacent the slotted panel end with the first tabs received by the first slots.

18. The sandwich panel structure of claim 1 wherein the first slotted panel facesheet further includes a plurality of first and second slots, the first and second slots are formed through the first slotted panel facesheet and are arranged in two generally parallel rows, the tabbed panel further includes a second tabbed panel facesheet, the second tabbed panel facesheet is disposed adjacent the second tabbed panel side, the second tabbed panel facesheet further includes a plurality of second tabs disposed respectively along a second joint edge, each of the second tabs is respectively sized and configured to be received by a respective one of the first and second slots upon insertion of the second tabs into the respective second slots for joining the tabbed panel to the slotted panel at the second joint edge.

19. A sandwich panel structure comprising:
  a slotted panel including a slotted panel core body and a first slotted panel facesheet, the slotted panel core body defining opposing first and second slotted panel sides, the first slotted panel facesheet disposed adjacent the first slotted panel side and including a plurality of first slots formed therethrough; and
  a tabbed panel including a tabbed panel core body and a first tabbed panel facesheet, the tabbed panel core body defining opposing first and second tabbed panel sides, the first tabbed panel facesheet disposed adjacent the first tabbed panel side, the first tabbed panel facesheet including a first joint edge and a plurality of first tabs disposed along the first joint edge with each of the first tabs respectively sized and configured to be received by a respective one of the first slots upon insertion of the first tabs into the first slots for joining the tabbed panel to the slotted panel at the first joint edge, the tabbed panel core body being formed of a cellular honeycomb material, the honeycomb material including a plurality of cells, the cells defining longitudinal axes extending perpendicular to the first and second slotted panel, the first tabs extending through the first slots parallel to the longitudinal axes of the cells.

20. A sandwich panel structure comprising:
  a slotted panel including a slotted panel core body and a first slotted panel facesheet, the slotted panel core body formed of a metal material and defining opposing first and second slotted panel sides, the first slotted panel facesheet disposed adjacent the first slotted panel side and including a plurality of first slots formed therethrough; and
  a tabbed panel including a tabbed panel core body and a first tabbed panel facesheet, the tabbed panel core body formed of a metal material and defining opposing first and second tabbed panel sides, the first tabbed panel facesheet disposed adjacent the first tabbed panel side, the first tabbed panel facesheet including a first joint edge and a plurality of first tabs disposed along the first joint edge with each of the first tabs respectively sized and configured to be received by a respective one of the first slots upon insertion of the first tabs into the first slots for joining the tabbed panel to the slotted panel at the first joint edge.

21. A sandwich panel structure comprising:
  a slotted panel including a slotted panel core body and a first slotted panel facesheet, the slotted panel core body defining opposing first and second slotted panel sides, the first slotted panel facesheet disposed adjacent the first slotted panel side, the first slotted panel facesheet including a plurality of first and second slots formed therethrough arranged in two generally parallel rows; and
  a tabbed panel including a tabbed panel core body, a first tabbed panel facesheet and a second tabbed panel facesheet, the tabbed panel core body defining opposing first and second tabbed panel sides, the first tabbed panel facesheet disposed adjacent the first tabbed panel side, the second tabbed panel facesheet disposed adjacent the second tabbed panel side, the first tabbed panel facesheet including a first joint edge and a plurality of first tabs disposed along the first joint edge with each of the first tabs respectively sized and configured to be received by a respective one of the first slots upon insertion of the first tabs into the first slots for joining the tabbed panel to the slotted panel at the first joint edge, the second tabbed panel facesheet including a plurality of second tabs disposed respectively along a second joint edge, each of the second tabs being respectively sized and configured to be received by a respective one of the first and second slots upon insertion of the second tabs into the respective second slots for joining the tabbed panel to the slotted panel at the second joint edge.

* * * * *